US008663067B2

(12) United States Patent
Mair et al.

(10) Patent No.: US 8,663,067 B2
(45) Date of Patent: Mar. 4, 2014

(54) METHOD FOR OPERATING AN AUTOMATIC TRANSMISSION

(75) Inventors: Roland Mair, Tettnang-Laimnau (DE); Florian Schneider, Lindenberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 765 days.

(21) Appl. No.: 12/529,588

(22) PCT Filed: Mar. 5, 2008

(86) PCT No.: PCT/EP2008/052669
§ 371 (c)(1),
(2), (4) Date: Jan. 21, 2010

(87) PCT Pub. No.: WO2008/113688
PCT Pub. Date: Sep. 25, 2008

(65) Prior Publication Data
US 2010/0151991 A1  Jun. 17, 2010

(30) Foreign Application Priority Data
Mar. 17, 2007  (DE) .......................... 10 2007 012 875

(51) Int. Cl.
*B60W 10/10* (2012.01)
*B60W 10/02* (2006.01)

(52) U.S. Cl.
USPC .................. 477/80; 477/115; 477/77; 477/84

(58) Field of Classification Search
USPC ...................................... 477/79, 80
See application file for complete search history.

(56) References Cited

U.S. PATENT DOCUMENTS

| 1,926,783 | A | * | 9/1933 | Miller ........................ 192/103 R |
| 4,514,811 | A | * | 4/1985 | Daubenmier et al. .......... 701/58 |
| 4,911,275 | A | | 3/1990 | Ohkumo et al. |
| 5,984,828 | A | * | 11/1999 | Huber .............................. 477/78 |
| 6,497,635 | B2 | * | 12/2002 | Suzuki .............................. 477/3 |
| 7,862,470 | B2 | * | 1/2011 | Eguchi et al. .................... 477/40 |
| 7,935,024 | B2 | * | 5/2011 | Winkel et al. ................... 477/80 |
| 8,192,327 | B2 | * | 6/2012 | Gibson et al. .................... 477/77 |
| 2001/0023385 | A1 | | 9/2001 | Nishimura et al. |

(Continued)

FOREIGN PATENT DOCUMENTS

| DE | 198 23 764 | 12/1998 |
| DE | 103 34 930 | 2/2005 |

(Continued)

*Primary Examiner* — David D Le
*Assistant Examiner* — Steven B Christ
(74) *Attorney, Agent, or Firm* — Davis & Bujold, PLLC; Michael J. Bujold

(57) ABSTRACT

A method of operating an automatic transmission of a motor vehicle. The automatic transmission, when the motor vehicle is driven with an actuated accelerator and an engaged starting clutch, and then coasts with the accelerator not actuated and the starting clutch engaged, during coasting with the engaged starting clutch the transmission remaining in the gear in which it was previously driven with the gas pedal actuated. When the transmission input speed of the automatic transmission drops below a limit value, during coasting, the starting clutch is disengaged. During coasting with a disengaged starting clutch in the automatic transmission, a gear is shifted that matches the current speed of the motor vehicle so that, when the starting clutch is subsequently engaged, a gear is available that matches the speed of the motor vehicle prevailing at the time the starting clutch is subsequently engaged.

11 Claims, 1 Drawing Sheet

(56) References Cited

U.S. PATENT DOCUMENTS

2005/0096181 A1* 5/2005 DeVore et al. ............... 477/118
2006/0160661 A1* 7/2006 Stasik et al. ................. 477/174
2006/0240943 A1* 10/2006 Winkel et al. .................. 477/70

FOREIGN PATENT DOCUMENTS

| DE | 601 04 461 | 8/2005 |
| DE | 10 2004 038 520 | 11/2009 |
| EP | 0 242 127 | 10/1987 |

* cited by examiner

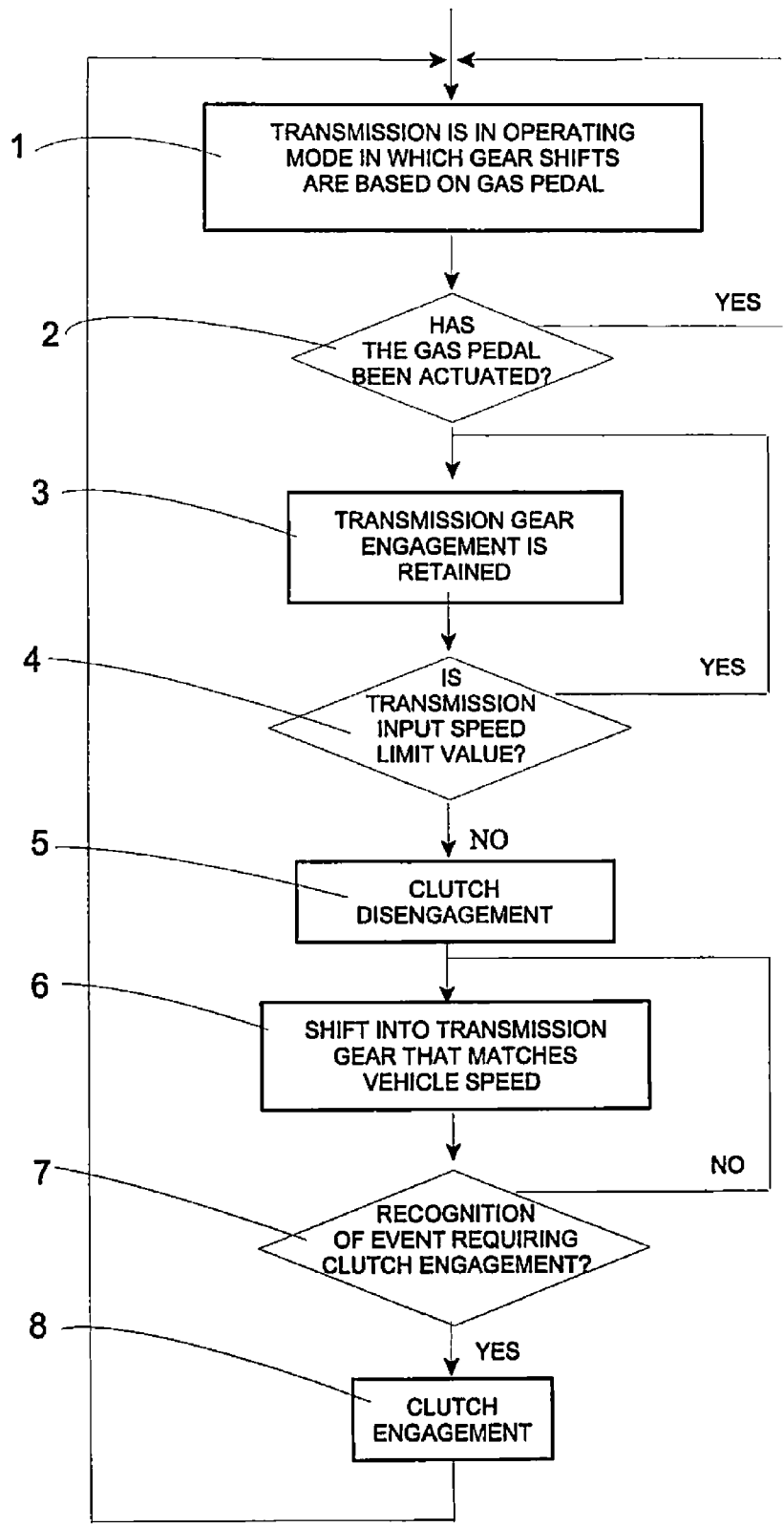

METHOD FOR OPERATING AN AUTOMATIC TRANSMISSION

This application is a National Stage completion of PCT/EP2008/052669 filed Mar. 5, 2008, which claims priority from German patent application serial no. 10 2007 012 875.6 filed Mar. 17, 2007.

FIELD OF THE INVENTION

The invention relates to a method for operating an automatic transmission.

BACKGROUND OF THE INVENTION

Vehicles require transmissions in order to convert torque and rotational speed. The task of a transmission is to convert the traction force produced by a drive assembly. The present invention relates to a method for operating an automatic transmission.

In the spirit of the present invention, the term "automatic transmission" shall apply to all synchronized transmissions and all unsynchronized transmissions with automated gear changing or automatic gear changing. In an automatic transmission with automated gear changing, gears are normally changed with an interruption in torque flow. However, in an automatic transmission with automatic gear changing, gears are normally changed without an interruption in torque flow. Automated constant-mesh countershaft transmissions or automated synchronized transmissions, for example, are included in the category of transmission with automated gear changing. Conventional, fully automatic transmissions belong to the category of transmission with automatic gear changing.

Furthermore, the term "automatic transmission" shall also apply to transmissions that have a plurality of transmission elements. Transmissions of this kind with a plurality of transmission parts are also called range-change transmissions, wherein either each transmission part of a range-change transmission is synchronized, or each transmission part of a range-change transmission is unsynchronized, or also at least one transmission part of a range-change transmission is synchronized, and the or all other transmission parts of the range-change transmission are designed to be non-synchronized.

In automatic transmissions known from practical application, subject to the actuation of a gas pedal of the motor vehicle, a shifting strategy is determined and a gear for the automatic transmission is selected accordingly. Then, when the motor vehicle coasts, or as the case may be coasts to a stop, with a non-actuated gas pedal, coast downshifts are carried out by a first group of automatic transmissions known from practical application. Such coast downshifts result in continual gear changes during coasting, or as the case may be coasting to a stop, however these are perceptible to the driver of the motor vehicle as changes in deceleration, because the internal combustion engine, after every coast downshift, runs through a relatively wide rotational speed range, and the trailing throttle torque thereof depends on the rotational speed. Such strongly varying decelerations of the motor vehicle resulting from such coast downshifts, along with the related noise development, are perceived as uncomfortable.

In order to avoid the disadvantages described above, automatic transmissions are also known from practical application that forego coast downshifts during coasting, or as the case may be coasting to a stop. In this second group of automatic transmissions, the automatic transmission, during coasting and also with an engaged starting clutch, remains in the gear in which the motor vehicle had previously been driven with an actuated gas pedal. Here however, there is continual monitoring of whether the transmission input speed falls below a limit value that approximates the idling speed of the internal combustion engine, and if the speed falls below this limit value, the starting clutch is disengaged in order to avoid trailing throttle or pushing operation of the internal combustion engine. The automatic transmission remains in the original gear, with disengaged starting clutch, however this can lead to an undesirable situation in which, when the starting clutch is subsequently engaged, for example as a result of actuating the gas pedal, a gear that does not match the vehicle's speed is selected by the automatic transmission. Then downshifts must first be carried out by the automatic transmission in order to meet the request for acceleration expressed by the actuation of the gas pedal.

However, these kinds of downshifts take a great deal of time, so that a reaction to the actuation of the gas pedal can only take place with some delay. This lack of spontaneity is also perceived as a disadvantage.

DE 10 2004 038 520 A1 discloses a method for operating an automatic transmission, wherein according to this prior art, when coasting or as the case may be coasting a motor vehicle to a stop, downshifts can be carried out while avoiding load changes during a downshift.

SUMMARY OF THE INVENTION

On that basis, the present invention is based on the problem of creating a novel method for operating an automatic transmission, by which the above disadvantages can be avoided.

This problem is solved by a method for operating an automatic transmission. According to the invention, when coasting with a disengaged starting clutch, a gear that matches the current speed is shifted in the automatic transmission, so that, when the starting clutch is subsequently engaged, a gear that matches the speed of the motor vehicle prevailing during engagement of the starting clutch is made available.

With the claimed method for operating an automatic transmission, coast downshifts during coasting, or as the case may be during coasting to a stop, are foregone. With the claimed method, it can be ensured that when, after disengaging the starting clutch during coasting, the starting clutch is subsequently re-engaged; the automatic transmission has shifted to a speed that matches the speed of the motor vehicle. Therefore, after shifting the starting clutch, no downshifts have to be carried out, so that subsequently the response to a driver's request can be carried out with a high degree of spontaneity.

The claimed method thus avoids all disadvantages of the state of the art, both the delays caused by coast downshifts and a lack of spontaneity.

BRIEF DESCRIPTION OF THE DRAWINGS

Preferred refinements of the invention are apparent from the sub-claims and the following description. Exemplary embodiments of the invention are described in more detail using the drawing, but are not restricted to it.

The sole FIGURE shows a schematic signal flow diagram to illustrate the inventive method for operating an automatic transmission.

DETAILED DESCRIPTION OF THE PREFERRED EMBODIMENTS

The present invention relates to a method for operating an automatic transmission of a motor vehicle, wherein the inventive method is described in more detail below with reference to the figure.

Block 1 in the signal flow diagram of the FIGURE visualizes an operating mode of an automatic transmission of a motor vehicle in which the automatic transmission, in an automated or automatic manner, shifts gears, in particular based on the actuation of a gas pedal pursuant to a shifting strategy that is implemented in a transmission control device of the automatic transmission.

With unchanged gas pedal actuation and driving on level ground, the automatic transmission, in an automated manner, or as the case may be automatically, selects a gear that matches the desired gas pedal actuation. When the motor vehicle is driven in this way, a so-called starting clutch of the automatic transmission is of course engaged.

According to Block 2 of the signal flow diagram in the figure, the actuation of the gas pedal is continually checked when the motor vehicle is in motion. If it is noted in Block 2 that the gas pedal has been actuated, there will be a return back from Block 2 to Block 1. If, on the other hand, it is noted in Block 2 that the gas pedal is not actuated and the motor vehicle is therefore coasting, or as the case may be coasting to a stop, a continuation from Block 2 to Block 3 takes place.

When the motor vehicle is rolling to a stop, the automatic transmission is initially operated, according to Block 3, in such a way that the automatic transmission, with an engaged starting clutch and foregoing coast downshifts, remains in the same gear, or as the case may be remains in the gear in which the motor vehicle is driven in the operating mode according to Block 1. Initially, therefore, after releasing a gas pedal in the spirit of Block 3, with an engaged starting clutch, the previously engaged gear of the automatic transmission is retained.

In Block 4, with this kind of coasting to a stop of the motor vehicle, the transmission input speed of the automatic transmission is continually monitored and compared to a limit value, which advantageously is close to the idling speed of a drive that is coupled to the automatic transmission. If it is determined in the process that the transmission input speed of the automatic transmission is above the limit value, a return starting from Block 4 back to Block 3 takes place. If, on the other hand, it is determined in Block 4 that the transmission input speed of the automatic transmission has reached this limit value or has even fallen below it, a continuation to Block 5 starting from Block 4 takes place.

In Block 5 of the inventive method, when the limit value for the transmission input speed is reached or the speed falls below this limit value, the starting clutch of the automatic transmission is disengaged in order to prevent trailing throttle or as the case may be pushing operation and thus a stalling of the engine.

Subsequently, according to the invention, in a Block 6, during coasting, or as the case may be coasting to a stop, with a disengaged starting clutch in the automatic transmission, a gear matching the current speed of the motor vehicle is shifted in order to make a gear available during subsequent engagement of the starting clutch that matches the prevailing speed of the motor vehicle during engagement of the starting clutch. With the above method, it is ensured that a downshift that is carried out with a disengaged starting clutch has no effect on the deceleration of the motor vehicle. Furthermore, because a gear matching the speed of the motor vehicle is always engaged, the required spontaneity is ensured. Because the starting clutch is not engaged upon conclusion of a shift in Block 6, there is no change in the rotational speed of the drive engine due to the shift. In Block 6, a single downshift or also a plurality of downshifts can be carried out in order to continually select a gear that is optimal for the speed of the motor vehicle. In Block 6, therefore, the starting clutch of the automatic transmission always remains disengaged.

In Block 7, it is checked whether an event is present that requires engagement of the starting clutch. If it is determined in Block 7 that no such event is present, a return back from Block 7 to Block 6 takes place. If, however, it is established in Block 7 that there is an event that requires engagement of the starting clutch, continuation from Block 7 to Block 8 is carried out, whereby, according to Block 8, the starting clutch is closed.

For Block 7, a plurality of events exist in which the disengaged state of the starting clutch during coasting of the motor vehicle to a stop must be exited and thus the starting clutch must be engaged. For example, when it is established in Block 7 that the gas pedal has been actuated, which is to say that a request for acceleration is present from the driver, the starting clutch is engaged.

In this case, in order to engage the starting clutch, the gear that was selected in Block 6 to match the speed of the motor vehicle is maintained.

If it is determined in Block 7 that a brake pedal of the motor vehicle is actuated, which is to say a request for deceleration exists, a continuation to Block 8 takes place, and the starting clutch is engaged. In this case, the starting clutch is engaged in order to exploit the deceleration torque of the drive if the transmission input speed is above the idling speed of the drive.

If it is determined in Block 7 that the engine has stalled during coasting, or as the case may be coasting to a stop, also a continuation from Block 7 to Block 8 takes place, and the starting clutch is engaged, so that the engine is carried along. This might be necessary in order to correctly operate a power-steering device of the motor vehicle and ensure safe operation of the motor vehicle. Furthermore, carrying along the engine in this way safeguards the function of other ancillary units of the engine, such as a compressor or an air-conditioning unit.

Another event that should be monitored in Block 7, which if it occurs should result in continuation to Block 8 and engagement of the starting clutch, relates to a state in which the motor vehicle, when coasting to a stop, or as the case may be coasting with a disengaged starting clutch, starts to accelerate without a request for acceleration. When such an event occurs, a state in which the starting clutch is disengaged must also be ended. This can take place in various ways in Block 8. A first alternative could be engagement of the starting clutch when the transmission input speed in the current gear, the one that was last engaged before the motor vehicle started accelerating, exceeds a specific value, or as the case may be, if the speed of the motor vehicle exceeds a speed that is subject to this gear. Then the starting clutch is engaged in this current gear.

It can be provided, according to a second alternative, that when the motor vehicle accelerates with a disengaged starting clutch, upshifts can still be performed, however the maximal upshift that can take place is the gear that was engaged before disengaging the starting clutch in the Blocks 3, 4, and 5. Once this gear is reached, and the transmission input speed exceeds a specified value, the starting clutch is engaged. According to a third alternative, it is also possible, in an intermediate gear between the current gear and the gear that was engaged before opening of the starting clutch, to upshift and, in this intermediate gear, close the starting clutch.

The method described above is used particularly in synchronized automatic transmissions in which automated gear changes are carried out with interruption of torque flow, or automatic gear changes are carried out without interruption of torque flow. The above method can also be used with so-called range-change transmissions, in which each transmission part of the range-change transmission is synchronized. Each synchronized transmission part is then operated according to the above method.

It is also possible to use the inventive method in unsynchronized transmissions or range-change transmissions having at least one unsynchronized transmission part, in which case, for the unsynchronized automatic transmission, or as the case may be the one, or each of the unsynchronized transmission parts of the range-change transmission, a rotational speed adjustment, or as the case may be a rotational speed harmonization is carried out by means of an engine intervention. Measures will be presented below, with which this kind of engine intervention can be carried out for the purpose of adjusting, or harmonizing the rotational speed while minimizing engine noise that could be perceived as annoying.

According to a first variant, the rotational speed adjustment can be done in such a way that the rotational speed of the drive or the engine, is carried out slowly, which is to say continually, or quasi-continually, so that no acoustic disturbance results from sudden, rapid rotational speed adjustments, or fuel release. In this way, gears can be tracked in unsynchronized automatic transmissions, or in unsynchronized transmission parts of a range-change transmission. At least at the time when the new gear is engaged in the unsynchronized automatic transmission, or the unsynchronized part of the range-change transmission, the unsynchronized automatic transmission, or the unsynchronized part of the transmission part is separated from the drive train, either by disengaging the starting clutch or by shifting another transmission part of the range-change transmission into neutral.

An additional possibility for carrying out the rotational speed adjustment by means of engine intervention in an unsynchronized automatic transmission or an unsynchronized transmission part of a range-change transmission, can be done by shifting the unsynchronized automatic transmission or the unsynchronized transmission part, into neutral in order to prepare for the adaptive shift at the end of the tracking phase. Because the drive train is interrupted by at least one transmission part, the starting clutch can be completely or partially engaged. This enables preparation for a rotational speed adjustment that must follow in order to make the adaptive shift. In this way, it is necessary only to bring the drive to the synchronous speed and engage the gear in order to carry out the adaptive shift. The gear can be engaged with an engaged, partially engaged or disengaged starting clutch. During the wait period until the adaptive shift, the engine rotational speed can be permanently tracked or brought closer to the target rotational speed in order to shorten the shifting time or in order to heighten spontaneity. It is also possible to add selector-actuating elements to every unsynchronized part of a transmission.

With variants of automatic transmissions which, for example, have no active brake, or which downstream of the starting clutch are connected to a motor, for example an electric motor in the case of a hybrid engine, rotational speed adjustment can be carried out without loss of comfort by this motor, for example the electric motor of the hybrid engine, so that gears can be continually tracked.

The invention claimed is:
1. A method of operating an automatic transmission incorporated into a motor vehicle, the method comprising the steps of:
 driving the motor vehicle with an accelerator actuated and a starting clutch of the automatic transmission engaged;
 upon removing actuation of the accelerator, commencing motor vehicle coasting with the starting clutch remaining engaged;
 during coasting, preventing downshifting when crossing a shift line and maintaining engagement of the starter clutch and maintaining the vehicle in a same gear in which the motor vehicle was driving with the accelerator actuated;
 continuously monitoring a transmission input speed of the automatic transmission;
 if, during coasting, the transmission input speed of the automatic transmission drops below a limit value, where the limit value is independent of the gear engaged, then disengaging the starter clutch and initiating a clutchless coasting; and
 during clutchless coasting with the starting clutch disengaged, shifting to a gear matching a current speed of the motor vehicle so that when the starting clutch is subsequently re-engaged, the gear matching a current speed of the motor vehicle is available and will match a prevailing speed of the motor vehicle, upon re-engagement of the starting clutch.

2. The method according to claim 1, further comprising the step of engaging the starting clutch during clutchless coasting when the accelerator is actuated.

3. The method according to claim 1, further comprising the step of engaging the starting clutch, during clutchless coasting, when a brake pedal is actuated.

4. The method according to claim 1, further comprising the step of engaging the starting clutch, during clutchless coasting, when a speed of the motor vehicle increases.

5. The method according to claim 1, further comprising the step of engaging the starting clutch, during clutchless coasting, when a drive of the motor vehicle stalls.

6. The method according to claim 1, further comprising the step of carrying out a rotational speed adjustment, by way of an intervention by an engine, for either an unsynchronized automatic transmission or at least one unsynchronized transmission part of the automatic transmission when the method is used for operating either the unsynchronized automatic transmission or the automatic transmission with at least one unsynchronized transmission part.

7. The method according to claim 6, further comprising the step of either continually or substantially continually tracking a rotational speed of the engine, at least in order to engage a new gear in either the unsynchronized automatic transmission or in the unsynchronized transmission part of the automatic transmission, the unsynchronized automatic transmission or the unsynchronized transmission part is disconnected from the drive train.

8. The method according to claim 6, further comprising the step of shifting into neutral either the unsynchronized automatic transmission or the unsynchronized transmission part of the automatic transmission, interrupting the drive train by at least one transmission part, and the starting clutch is either completely or partially engaged, and in order to engage a new gear, the engine is brought to a synchronous speed and the gear change is carried out.

9. A method of operating an automatic transmission of a motor vehicle with the automatic transmission being engaged in an initial gear, a starting clutch being engaged and a gas pedal being un-actuated, the method comprising the steps of:
 preventing downshifting when crossing a shift line during clutch engaged coasting;
 continuously monitoring a transmission input speed of the automatic transmission;

only disengaging the starting clutch in an event that the transmission input speed falls below a limit value, where the limit value is dependent upon a speed of an engine and independent of the gear engaged;

during a clutchless coasting phase, if necessary, shifting the automatic transmission from the initial gear to a subsequent gear that corresponds to a current speed of the motor vehicle will be available and match a prevailing speed of the motor vehicle upon re-engagement of the starting clutch; and re-engaging the starting clutch when one of the gas pedal is actuated, a brake pedal is actuated and the engine is stalled, such that the subsequent gear of automatic transmission corresponds to the current speed of the motor vehicle.

10. The method according to claim 9, further comprising the step of selecting the limit value for the transmission input shaft to be an idle speed the engine so as to prevent both a trailing throttle and stalling of the engine.

11. The method according to claim 1, further comprising the step of selecting the limit value for the transmission input shaft to be an idle speed an engine, which is coupled to the transmission by the starting clutch, so as to prevent both a trailing throttle and stalling of the engine.

* * * * *